J. PIETZUCH.
FOOT MEASURING SCALE.
APPLICATION FILED MAY 25, 1917.

1,324,267.

Patented Dec. 9, 1919.

Inventor
Joseph Pietzuch.

Witness
R. A. Thomas.

UNITED STATES PATENT OFFICE.

JOSEPH PIETZUCH, OF CINCINNATI, OHIO.

FOOT-MEASURING SCALE.

1,324,267.  Specification of Letters Patent.  Patented Dec. 9, 1919.

Application filed May 25, 1917. Serial No. 170,826.

*To all whom it may concern:*

Be it known that I, JOSEPH PIETZUCH, a citizen of the United States of America, residing at Cincinnati, in the county of Hamilton, State of Ohio, have invented certain Improvements in Foot-Measuring Scales, of which the following is a description, reference being had to the accompanying drawings, forming a part thereof.

The object of the invention is to provide a simple and inexpensive foot measuring device designed for use in fitting shoes and hose, and especially adapted for use in mail order business; and particularly to provide a chart having the required measuring elements and bearing directions to enable the customer to accurately supply the information necessary to enable the dealer to fill the order.

Further objects and advantages of the invention will appear in the following description of a preferred embodiment, it being understood that changes in the form, proportion and minor details may be resorted to within the scope of the appended claims without departing from the spirit of the invention.

In the drawings illustrating a preferred embodiment of the invention,

Figure 1:
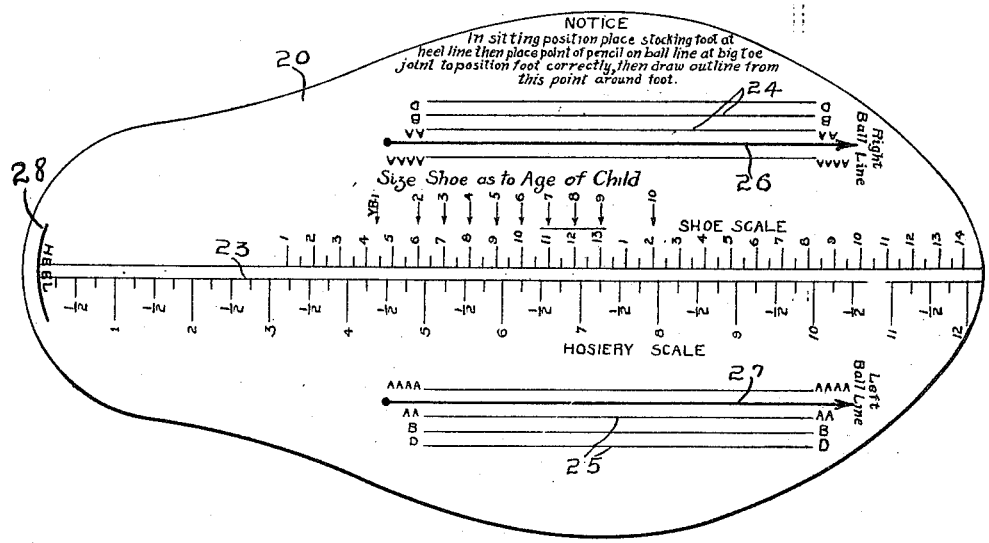
Figure 1 is a plan view of a measuring chart.
Figure 2:
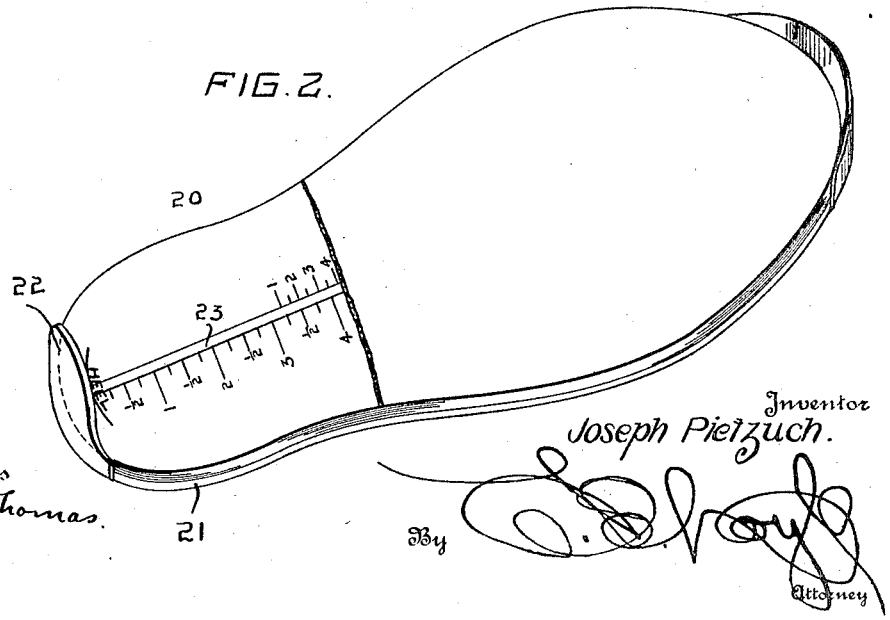
Fig. 2 is a perspective view showing a stand or holder with a block or tablet of charts arranged therein.

In the illustrated embodiment of the invention, the chart 20 which may be arranged in a convenient stand or holder 21 having a heel piece 22, is provided with a longitudinal medial length measure 23, consisting of parallel lines extending the full length of the chart and having branch lines, extending transversely, on one side thereof to represent a hosiery scale and on the other side to represent a shoe scale, different portions of the shoe scale being adapted to indicate sizes of children's shoes and adults' shoes.

Preferably the chart is of a form providing a reduced heel portion and an enlarged toe portion, and in the enlarged toe or body portion, on opposite sides of the medial length scale, there are arranged right and left width scales consisting of longitudinal lines 24 and 25, distinguishably designated as to foot or shoe widths as AA, B, D, etc., disposed with reference to right and left side positioning lines 26 and 27.

In the otherwise unoccupied spaces on the chart directions as to use may appear, as shown in the drawing, the curved line 28 for the heel being so designated to indicate that the heel of the foot to be measured is to be placed touching said line, and the right and left side positioning lines being designated as right and left ball lines, and the hosiery and shoe length scales being appropriately designated, to indicate to the customer that in the use of the chart, the heel of the foot should be placed on the heel positioning line and the ball or great toe joint should be placed on the proper ball line, whereupon the length and width measurements whether for shoes or hosiery will be indicated on the proper scales. To render the indication of the measurement more accurate, a pencil outline or map of the foot may be made after positioning as above noted and the chart may then be forwarded to the shoe dealer to afford him the information necessary to enable him to furnish articles of the required size.

It is obvious that the device can be produced and placed on the market at a practically negligible cost and yet when properly used will furnish means for securing an accurate fitting of shoes and hose, whether the customer is or is not at the point of issue or the place of business of the dealer.

What I claim is:—

1. A foot measuring and shoe or hose fitting chart, having a longitudinal medial length measuring line, right and left lateral positioning lines on either side of the length scale, and width measuring scales associated respectively with said positioning scales, the central longitudinal line extending the entire length of the chart.

2. A foot measuring and shoe or hose fitting chart, having an intermediate length scale, right and left distinguishably side positioning lines, directly on each side thereof and in close proximity thereto, and right and left width scales associated respectively with said positioning lines.

3. A foot measuring and shoe and hose fitting chart having an intermediate longitudinal length scale provided with shoe and hose length graduations, right and left lateral positioning lines disposed on either side of the length scale, and distinguishably designated width scales disposed in operative relation respectively with said lateral positioning lines.

This specification signed and witnessed this 4th day of January, A. D. 1917.

JOSEPH PIETZUCH.

Witnesses:
GEO. R. STROUP,
ALVIN J. VOGT.